United States Patent
Abgrall

(10) Patent No.: US 6,542,160 B1
(45) Date of Patent: Apr. 1, 2003

(54) RE-GENERATING A DISPLAYED IMAGE

(75) Inventor: Jean-Paul Abgrall, San Jose, CA (US)

(73) Assignee: Phoenix Technologies Ltd., San Jose, CA (US)

(*) Notice: Subject to any disclaimer, the term of this patent is extended or adjusted under 35 U.S.C. 154(b) by 0 days.

(21) Appl. No.: 09/336,255

(22) Filed: Jun. 18, 1999

(51) Int. Cl.[7] .............................................. G06F 13/00
(52) U.S. Cl. ....................... 345/537; 345/522; 345/559
(58) Field of Search ................................ 345/536–538, 345/559, 522

(56) References Cited

U.S. PATENT DOCUMENTS

| 5,121,345 A | 6/1992 | Lentz |
| 5,128,995 A | 7/1992 | Arnold et al. |
| 5,131,089 A | 7/1992 | Cole |
| 5,142,680 A | 8/1992 | Ottman et al. |
| 5,146,568 A | 9/1992 | Flaherty et al. |
| 5,214,695 A | 5/1993 | Arnold et al. |
| 5,274,816 A | 12/1993 | Oka |
| 5,280,627 A | 1/1994 | Flaherty et al. |
| 5,307,497 A | 4/1994 | Feigenbaum et al. |
| 5,325,532 A | 6/1994 | Crosswy et al. |
| 5,379,431 A | 1/1995 | Lemon et al. |
| 5,381,549 A | 1/1995 | Tamura |
| 5,418,918 A | 5/1995 | Vander Kamp et al. |
| 5,444,850 A | 8/1995 | Chang |
| 5,448,741 A | 9/1995 | Oka |
| 5,452,454 A | 9/1995 | Basu |
| 5,463,766 A | 10/1995 | Schieve et al. |
| 5,469,573 A | 11/1995 | McGill, III et al. |
| 5,504,905 A | 4/1996 | Cleary et al. |
| 5,522,076 A | 5/1996 | Dewa et al. |
| 5,526,523 A | 6/1996 | Straub et al. |
| 5,542,082 A | 7/1996 | Solhjell |
| 5,581,740 A | 12/1996 | Jones |
| 5,586,327 A | 12/1996 | Bealkowski et al. |

(List continued on next page.)

Primary Examiner—Kee M. Tung

(57) ABSTRACT

The present invention is a method and apparatus to re-generate a displayed image. Graphic information is retrieved from a first storage. A graphic controller uses the graphic information to generate the displayed image. The first storage is accessible to a processor and the graphic controller. The graphic information is stored in a second storage which is accessible to the processor. The stored graphic information is retrieved from the second storage. The stored graphic information is written to the first storage to cause the graphic controller to re-generate the displayed image.

40 Claims, 8 Drawing Sheets

U.S. PATENT DOCUMENTS

| | | |
|---|---|---|
| 5,594,903 A | 1/1997 | Bunnell et al. |
| 5,604,890 A | 2/1997 | Miller |
| 5,652,868 A | 7/1997 | Williams |
| 5,652,886 A | 7/1997 | Tulpule et al. |
| 5,664,194 A | 9/1997 | Paulsen |
| 5,680,547 A | 10/1997 | Chang |
| 5,692,190 A | 11/1997 | Williams |
| 5,694,583 A | 12/1997 | Williams et al. |
| 5,694,600 A | 12/1997 | Khenson et al. |
| 5,701,477 A | 12/1997 | Chejlava, Jr. |
| 5,715,456 A | 2/1998 | Bennett et al. |
| 5,717,930 A | 2/1998 | Imai et al. |
| 5,727,213 A | 3/1998 | Vander Kamp et al. |
| 5,732,268 A | 3/1998 | Bizzarri |
| 5,748,957 A | 5/1998 | Klein |
| 5,754,853 A | 5/1998 | Pearce |
| 5,764,593 A | 6/1998 | Turpin et al. |
| 5,781,758 A | 7/1998 | Morley |
| 5,790,849 A | 8/1998 | Crocker et al. |
| 5,796,984 A | 8/1998 | Pearce et al. |
| 5,802,363 A | 9/1998 | Williams et al. |
| 5,805,880 A | 9/1998 | Pearce et al. |
| 5,805,882 A | 9/1998 | Cooper et al. |
| 5,815,706 A | 9/1998 | Stewart et al. |
| 5,819,063 A | 10/1998 | Dahl et al. |
| 5,828,888 A | 10/1998 | Kozaki et al. |
| 5,832,251 A | 11/1998 | Takahashi |
| 5,842,011 A | 11/1998 | Basu |
| 5,854,905 A | 12/1998 | Garney |
| 5,864,698 A | 1/1999 | Krau et al. |
| 5,887,164 A | 3/1999 | Gupta |
| 5,901,310 A | 5/1999 | Rahman et al. |
| 5,907,679 A | 5/1999 | Hoang et al. |
| 5,966,142 A * | 10/1999 | Harkin ..................... 345/522 |
| 6,115,054 A * | 9/2000 | Giles ......................... 345/522 |

* cited by examiner

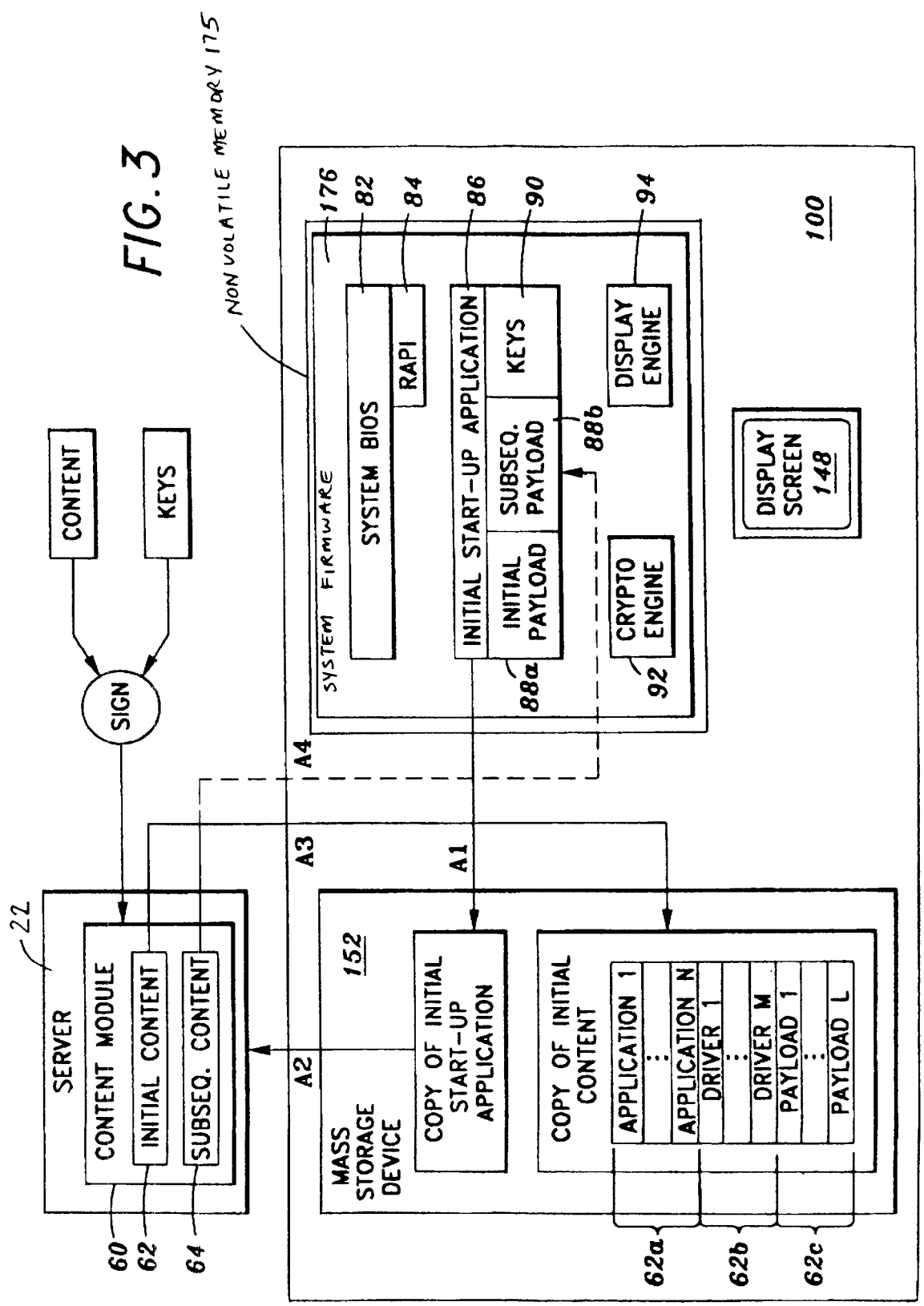

RE-GENERATING A DISPLAYED IMAGE

BACKGROUND

1. Field of the Invention

This invention relates to graphics. In particular, the invention relates to graphic display.

2. Description of Related Art

Rendering a graphic object for display on a display screen is a tedious process. In a typical graphic environment, a graphic controller or a rendering engine is used to accelerate the generation of image. The graphic controller has hardware resources to perform graphic operations at an extremely fast speed. Examples of these graphic operations include line drawing, triangle drawing, shading, block filling, perspective generation, coloring, and graphic transformation (e.g., scaling, rotation, and translation).

The content of a displayed image is typically stored in a frame buffer accessible to the graphic controller. When it is desired to re-generate a previously rendered image, traditional methods typically use a screen capture technique. The screen capture technique involves the transfer of the contents of the frame buffer which corresponds to the displayed image to another temporary storage. This temporary storage is later restored back to the frame buffer to allow the graphic controller to re-display the image.

The screen capture technique suffers a number of drawbacks. First, the process is slow because it requires the transfer of the entire frame buffer. For large images, the time to transfer the graphic data may be prohibitively high. Second, the process requires another buffer memory of the same size as the frame buffer to store the entire graphic data. In applications where processing time and storage requirements are critical, traditional methods using the screen capture technique are not suitable.

Therefore there is a need in the technology to provide a simple and efficient method to re-generate a displayed image.

SUMMARY

The present invention is a method and apparatus to re-generate a displayed image. Graphic information is retrieved from a first storage. A graphic controller uses the graphic information to generate the displayed image. The first storage is accessible to a processor and the graphic controller. The graphic information is stored in a second storage which is accessible to the processor. The stored graphic information is retrieved from the second storage. The stored graphic information is written to the first storage to cause the graphic controller to re-generate the displayed image.

BRIEF DESCRIPTION OF THE DRAWINGS

The features and advantages of the present invention will become apparent from the following detailed description of the present invention in which:

FIG. 3 illustrates a logical diagram of one embodiment of the invention.

DESCRIPTION

Figure 1:
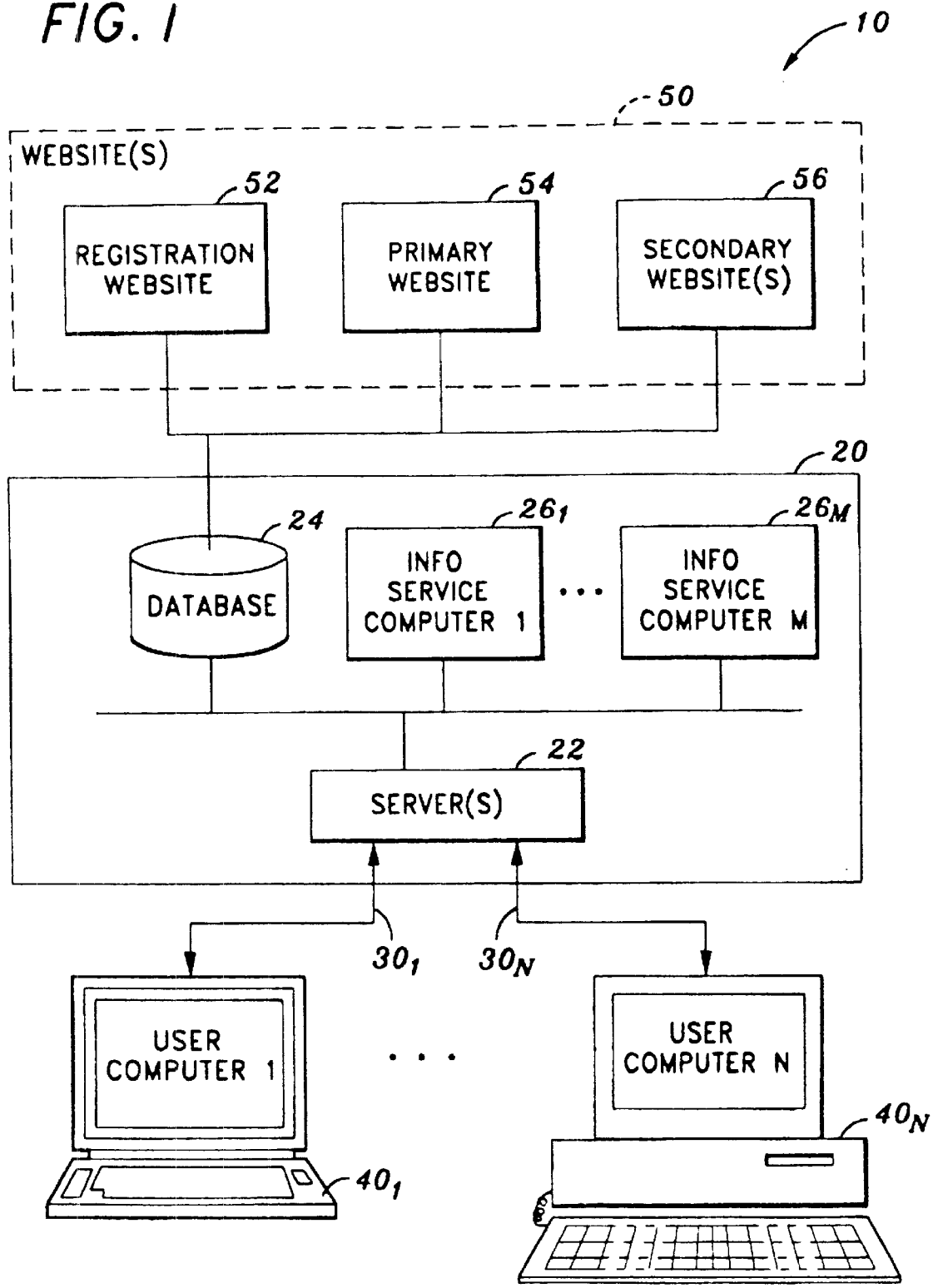
FIG. 1 is a system block diagram of one embodiment of an information distribution system in which the apparatus and method of the invention is used.

The present invention is a method and apparatus to re-generate a displayed image. The technique retrieves the graphic information used by a graphic controller in generating the displayed image. The graphic information is then stored in a storage accessible to a processor. When it is desired to re-generate the displayed image, the graphic information is restored and the graphic controller is activated to render the previously rendered image using the restored graphic information.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Definitions

As discussed herein, a "computer system" is a product including circuitry capable of processing data. The computer system may include, but is not limited to, general purpose computer systems (e.g., server, laptop, desktop, palmtop, personal electronic devices, etc.), personal computers (PCs), hard copy equipment (e.g., printer, plotter, fax machine, etc.), banking equipment (e.g., an automated teller machine), and the like. An infomediary is a web site that provides information on behalf of producers of goods and services, supplying relevant information to businesses about products and/or services offered by suppliers and other businesses. Content refers to application programs, driver programs, utility programs, the payload, etc., and combinations thereof, as well as graphics, informational material (articles, stock quotes, etc.) and the like, either singly or in any combination. "Payload" refers to messages with graphics or informational material (such as, articles, stock quotes, etc.) and may include files or applications. In one embodiment, it is transferred at a predetermined time to the system's mass storage media. In addition, a "communication link" refers to the medium or channel of communication. The communication link may include, but is not limited to, a telephone line, a modem connection, an Internet connection, an Integrated Services Digital Network ("ISDN") connection, an Asynchronous Transfer Mode (ATM) connection, a frame relay connection, an Ethernet connection, a coaxial connection, a fiber optic connection, satellite connections (e.g. Digital Satellite Services, etc.), wireless connections, radio frequency (RF) links, electromagnetic links, two way paging connections, etc., and combinations thereof.

In addition, the loading of an operating system ("OS") refers to the initial placement of the operating system bootstrap loader. In one embodiment, during the OS load, a sector of information is typically loaded from a hard disk into the system memory. Alternatively, the bootstrap loader is loaded from a network into system memory. An OS "boot" refers to the execution of the bootstrap loader. This places the OS in control of the system. Some of the actions performed during the OS boot include system configuration, device detection, loading of drivers and user logins. OS runtime refers to the completion of the boot phase and the beginning of the execution of applications by the OS. In one embodiment, during OS runtime, the OS interacts with the user to execute and/or run applications.

Power On Self Test (POST) refers to the instructions that are executed to configure and test the system hardware prior to loading an OS.

System Overview

A description of an exemplary system, which incorporates embodiments of the present invention, is hereinafter described.

FIG. 1 shows a system block diagram of one embodiment of an information distribution system 10 in which the apparatus and method of the invention is used. The system 10 relates to providing an infomediary. It involves the construction and maintenance of a secure and private repository of Internet user and system profiles, collected primarily from warranty service registrations, Internet service registrations, system profiles, and user preferences. Initially, this information is used to register the user with the manufacturers of purchased hardware and software products, and with the providers of on-line or other services. Over time, the user data is used to create a user profile and notify users of relevant software updates and upgrades, to encourage on-line purchases of related products, and to enable one-to-one customized marketing and other services.

In one embodiment, two software modules are used to implement various embodiments of the invention. One is resident on a user's system, and is used to access a predetermined web site. For example, in one embodiment, the operating system and Basic Input and Output System (BIOS) are pre-installed on a computer system, and when the computer system is subsequently first powered up, an application, referred to for discussion purposes as the first software module (in one embodiment, the first software module is the initial start-up application (ISUA), which will be described in the following sections), will allow the launching of one or more executable programs in the pre-boot environment. In one embodiment, the first software module facilitates the launching of one or more executable programs prior to the loading, booting, execution and/or running of the OS. In one embodiment, the user is encouraged to select the use of such a program (i.e., the use of the first software module), and in alternative embodiments, the program is automatically launched. The program(s) contained in the first software module enables tools and utilities to run at an appropriate time, and with proper user authorization, also allow the user to download a second software module that includes drivers, applications and additional payloads through the Internet connection on the PC. The programs may also provide for remote management of the system if the OS fails to launch successfully.

Once the second software has been delivered, it may become memory resident, and may disable the transferred copy of the first software module. The original copy of the first software module still residing in the system's non-volatile memory remains idle until the second software module fails to function, becomes corrupted or is deleted, upon which a copy of the original first software module is again transferred as described above. The second software module may include an application that connects the user to a specific server on the Internet and directs the user to a predetermined web site to seek authorization to down load further subscription material. The second software module may also include content that is the same or similar to the content of the first software module.

In one embodiment, the system may also include an initial payload that is stored in Read Only Memory BIOS (ROM BIOS). In one embodiment, the initial payload is part of the first software module (e.g., the ISUA). In an alternative embodiment, the initial payload is stored as a module in ROM BIOS, separate from the first software module. In one embodiment, the initial payload is launched from ROM BIOS and displayed on the screen after the Power On Self Test (POST) but prior to the booting, loading and/or execution of the OS. This may occur at a predetermined time, such as when the system is being manufactured, assembled and tested, or when the end user first activates the system. In an alternate embodiment, this initial payload is copied to a predetermined location (such as the system's hard disk) at a predetermined time, such as when the system is being manufactured, assembled and tested, or when the end user first activates the system. Once copied, the payload executes after POST but prior to operation of the OS, and may display graphics, advertisements, animation, Joint Photographic Experts Group (JPEG)Moving Picture Experts Group (MPEG) formatted material on the screen. When additional programs and/or payloads are delivered (via the Internet or other outside connection), the display screen may be used to provide customized screens in the form of messages or graphics prior to and during booting of the OS. In addition, executable programs delivered in the first software module, as well as subsequent programs (such as the second software module) downloaded from the web site, may be used to survey the PC to determine various types of devices, drivers, and applications installed. In one embodiment, as described in co-pending U.S. patent application Ser. No. 09/336,289, entitled "Method and Apparatus for Automatically Installing And Configuring Software on a Computer" incorporated herein by reference, the first software module is used to identify and to automatically create shortcuts and/or bookmarks for the user. The programs downloaded from the website may include software that collects and maintains a user profile based on the user's preferences. Such information may be provided to the infomediary, which subsequently forwards portions of the information and/or compiled data based on the information to suppliers and other businesses to obtain updates or revisions of information provided by the suppliers and other businesses.

Referring to FIG. 1, the information distribution system 10 comprises a service center 20 that is connected over one or more communications links $30_1$–$30_N$ to one or more user computer systems $40_1$–$40_N$ ("40"). The service center 20 includes one or more servers 22, one or more databases 24, and one or more computers $26_1$–$26_M$. The one or more computers $26_1$–$26_M$ are capable of simultaneous access by a plurality of the user computer systems $40_1$–$40_N$. If a plurality of computers are used, then the computers $26_1$–$26_M$ may be connected by a local area network (LAN) or any other similar connection technology. However, it is also possible for the service center 20 to have other configurations. For example, a smaller number of larger computers (i.e. a few mainframe, mini, etc. computers) with a number of internal programs or processes running on the larger computers capable of establishing communications links to the user computers.

The service center 20 may also be connected to a remote network 50 (e.g., the Internet) or a remote site (e.g., a satellite, which is not shown in FIG. 1). The remote network 50 or remote site allows the service center 20 to provide a wider variety of computer software, content, etc. that could be stored at the service center 20. The one or more databases 24 connected to the service center computer(s), e.g., computer 26$_1$, are used to store database entries consisting of computer software available on the computer(s) 26. In one embodiment, each user computer 40$_1$–40$_N$ has its own secure database (not shown), that is not accessible by any other computer. The communication links 30$_1$–30$_N$ allow the one or more user computer systems 40$_1$–40$_N$ to simultaneously connect to the computer(s) 26$_1$–26$_M$. The connections are managed by the server 22.

After a user computer system 40 establishes two-way communications with the information service computer 26, the content is sent to the user computer system 40 in a manner hereinafter described. The downloaded content includes an application that surveys the user and/or the user computer system's hardware and/or software to develop a user profile as well as a profile of the user's system. The information gathered from the user and/or user's computer system is subsequently provided to the service center 20, which provides additional content to the user computer 40 based on the user and system profile. The database entries from the database connected to the service computer 26 contain information about computer software, hardware, and third party services and products that are available to a user. Based on the user and/or system profile, the content is further sent to the user computer for display. The content may also include a summary of information such as the availability of patches and fixes for existing computer software, new versions of existing computer software, brand new computer software, new help files, etc. The content may further include information regarding availability of hardware and third party products and services that is of interest to the user. The user is then able to make one or more choices from the summary of available products and services, and request that the products be transferred from the service computer 26 to the user computer. Alternatively, the user may purchase the desired product or service from the summary of available products and services.

Figure 2:
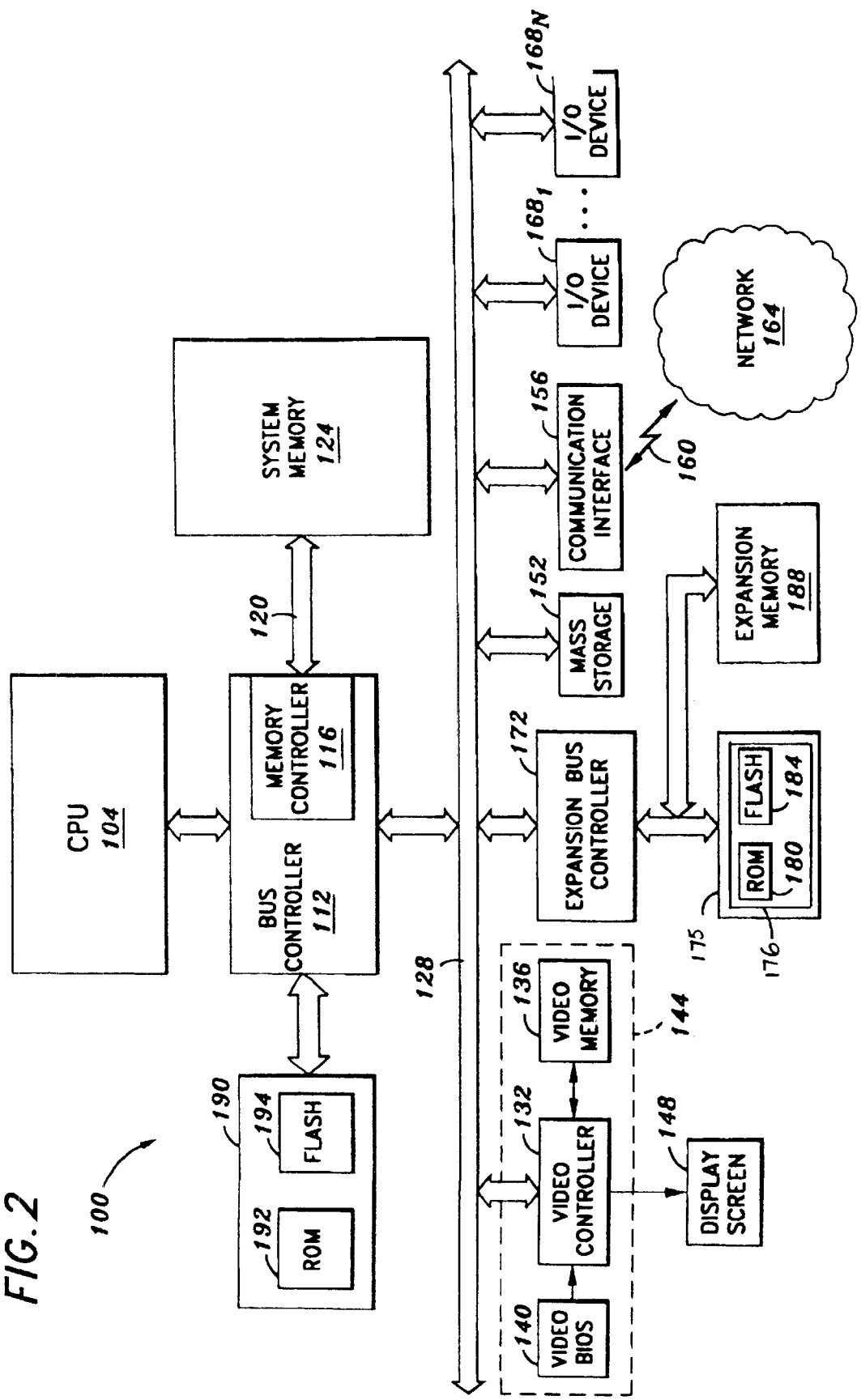
FIG. 2 illustrates an exemplary processor system or user computer system which implements embodiments of the present invention.

FIG. 2 illustrates an exemplary computer system 100 that implements embodiments of the present invention. The computer system 100 illustrates one embodiment of user computer systems 40$_1$–40$_N$ and/or computers 26$_1$–26$_M$ (FIG. 1), although other embodiments may be readily used.

Referring to FIG. 2, the computer system 100 comprises a processor or a central processing unit (CPU) 104. The illustrated CPU 104 includes an Arithmetic Logic Unit (ALU) for performing computations, a collection of registers for temporary storage of data and instructions, and a control unit for controlling operation for the system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. The CPU 104 is not limited to microprocessor but may take on other forms such as microcontrollers, digital signal processors, reduced instruction set computers (RISC), application specific integrated circuits, and the like. Although shown with one CPU 104, computer system 100 may alternatively include multiple processing units.

The CPU 104 is coupled to a bus controller 112 by way of a CPU bus 108. The bus controller 112 includes a memory controller 116 integrated therein, though the memory controller 116 may be external to the bus controller 112. The memory controller 116 provides an interface for access by the CPU 104 or other devices to system memory 124 via memory bus 120. In one embodiment, the system memory 124 includes synchronous dynamic random access memory (SDRAM). System memory 124 may optionally include any additional or alternative high speed memory device or memory circuitry. The bus controller 112 is coupled to a system bus 128 that may be a peripheral component interconnect (PCI) bus, Industry Standard Architecture (ISA) bus, etc. Coupled to the system bus 128 are a graphics controller, a graphics engine or a video controller 132, a mass storage device 152, a communication interface device 156, one or more input/output (I/O) devices 168$_1$–168$_N$, and an expansion bus controller 172. The video controller 132 is coupled to a video memory 136 (e.g., 8 Megabytes) and video BIOS 140, all of which may be integrated onto a single card or device, as designated by numeral 144. The video memory 136 is used to contain display data for displaying information on the display screen 148, and the video BIOS 140 includes code and video services for controlling the video controller 132. In another embodiment, the video controller 132 is coupled to the CPU 104 through an Advanced Graphics Port (AGP) bus.

The mass storage device 152 includes (but is not limited to) a hard disk, floppy disk, CD-ROM, DVD-ROM, tape, high density floppy, high capacity removable media, low capacity removable media, solid state memory device, etc., and combinations thereof. The mass storage device 152 may include any other mass storage medium. The communication interface device 156 includes a network card, a modem interface, etc. for accessing network 164 via communications link 160. The I/O devices 168$_1$–168$_N$ include a keyboard, mouse, audio/sound card, printer, and the like. The I/O devices 168$_1$–168$_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable media drive, a low capactiy media device, and/or any combination thereof. The expansion bus controller 172 is coupled to non-volatile memory 175 which includes system firmware 176. The system firmware 176 includes system BIOS 82, which is for controlling, among other things, hardware devices in the computer system 100. The system firmware 176 also includes ROM 180 and flash (or EEPROM) 184. The expansion bus controller 172 is also coupled to expansion memory 188 having RAM, ROM, and/or flash memory (not shown). The system 100 may additionally include a memory module 190 that is coupled to the bus controller 112. In one embodiment, the memory module 190 comprises a ROM 192 and flash (or EEPROM) 194.

As is familiar to those skilled in the art, the computer system 100 further includes an operating system (OS) and at least one application program, which in one embodiment, are loaded into system memory 124 from mass storage device 152 and launched after POST. The OS may include any type of OS including, but not limited or restricted to, DOS, Windows™ (e.g., Windows 95™, Windows 98™, Windows NT™), Unix, Linux, OS/2, OS/9, Xenix, etc. The operating system is a set of one or more programs which control the computer system's operation and the allocation of resources. The application program is a set of one or more software programs that performs a task desired by the user.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 124, as well as other processing of signals. The memory locations where data bits are maintained are physical locations that have particular electrical, magnetic, optical, or organic properties corresponding to the data bits.

When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 3 illustrates a logical diagram of computer system 100. Referring to FIGS. 2 and 3, the system firmware 176 includes software modules and data that are loaded into system memory 124 during POST and subsequently executed by the processor 104. In one embodiment, the system firmware 176 includes a system BIOS module 82 having system BIOS handlers, hardware routines, etc., a ROM application program interface (RAPI) module 84, an initial start-up application (ISUA) module 86, an initial payload 88, cryptographic keys 90, a cryptographic engine 92, and a display engine 94. The aforementioned modules and portions of system firmware 176 may be contained in ROM 180 and/or flash 184. Alternatively, the aforementioned modules and portions of system firmware 176 may be contained in ROM 190 and/or flash 194. The RAPI 84 provides a secure interface between ROM application programs and system BIOS 82. The RAPI 84, ISUA 86, and initial payload 88a may each be separately developed and stored in the system firmware 176 prior to initial use of the computer system 100. In one embodiment, the RAPI 84, ISUA 86, and initial payload 88 each includes proprietary software developed by Phoenix Technologies, Ltd. One embodiment of RAPI 84 is described in co-pending U.S. patent application Ser. No. 09/336,889 entitled "System and Method for Securely Utilizing Basic Input and Output System (BIOS) Services," filed on Jun. 18, 1999, assigned to Phoenix Technologies, Ltd., and which is incorporated herein by reference. One embodiment of ISUA 86 is described in co-pending U.S. patent application Ser. No. 09/336,889 entitled "Method and Apparatus for Automatically Installing and Configuring Software on a Computer," filed on Jun. 18, 1999, assigned to Phoenix Technologies, Ltd., and which is incorporated herein by reference.

Figure 4A:
FIG. 4A and FIG. 4B illustrates one embodiment of a process flow chart provided in accordance with the principles of the invention.
Figure 4B:
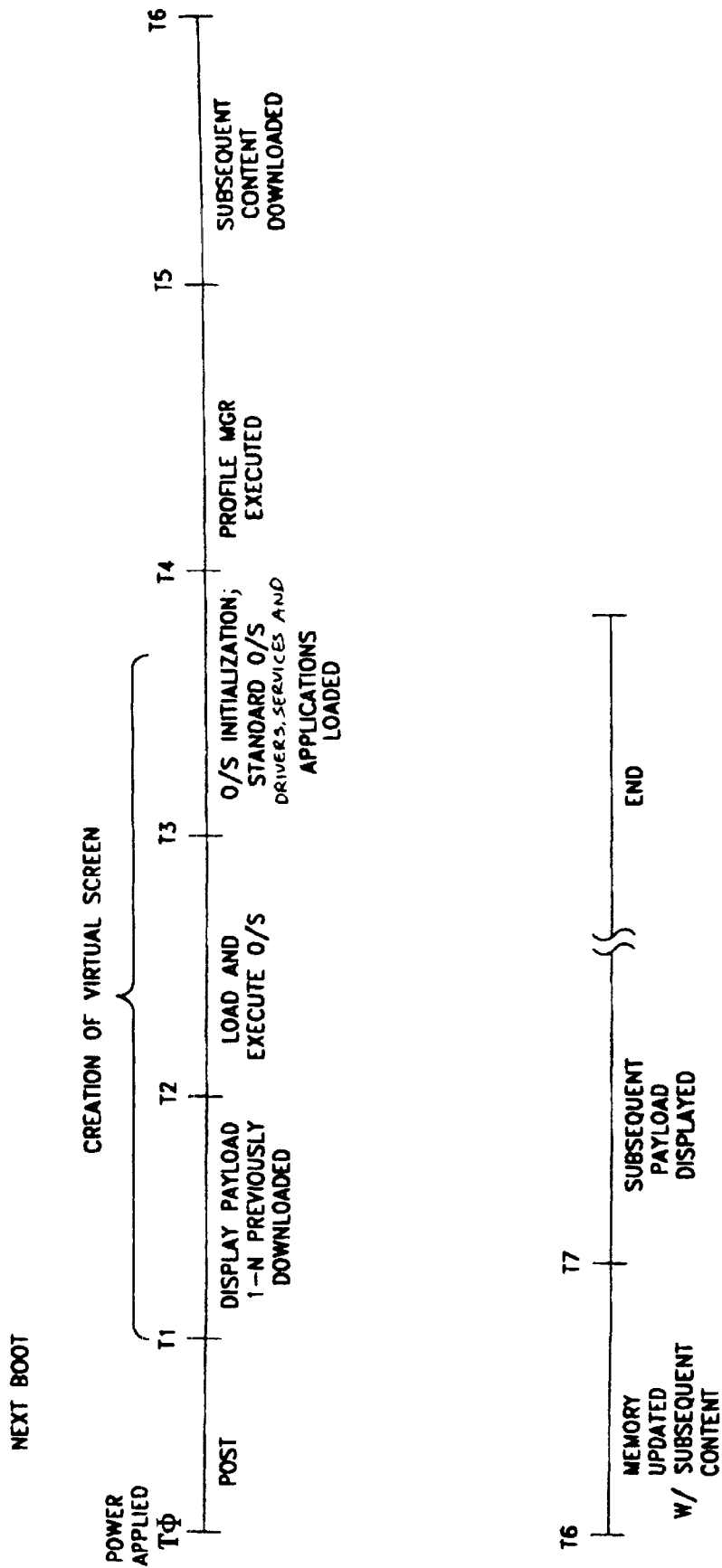

In one embodiment, as shown in FIGS. 3 and 4A and 4B, after power is initially turned on to a new computer system 100, the system commences with POST procedures. During the initial POST, the ISUA 86 is transferred to the mass storage device 152, as shown by A1. In one embodiment, such a transfer is made during the manufacturing and/or assembly process, when the system 100 is first powered up after the operating system has been installed (but prior to loading and running the operating system). In an alternative embodiment, such a transfer may be made after the manufacturing and/or assembly process, after the user receives and powers up the system 100. In a further alternate embodiment, during the transfer of the ISUA 86, additional programs, applications, drivers, data, graphics and other information may also be transferred (for example, from ROM) to the mass storage device 152. For example, the transfer may include the transfer of the initial payload 88a to the mass storage device 152, subsequent to which the initial payload is delivered from the mass storage device 152. Alternatively, the initial payload may be delivered from the ROM. One embodiment of the system and process for facilitating such a transfer is described in co-pending U.S. patent application Ser. No. 09/336,067, entitled "System and Method for Transferring an Application Program from System Firmware to a Storage Device" filed on Jun. 18, 1999, which is assigned to Phoenix Technologies, Ltd., the contents of which are incorporated herein by reference. Alternative embodiments of the system and process for facilitating such a transfer are described in co-pending U.S. patent application Ser. No. 09/272,859, entitled "Method and Apparatus for Providing Memory-based Device Emulation" filed on Mar. 19, 1999, in co-pending U.S. Patent Continuation-in-Part application Ser. No. 09/336,307, entitled "Method and Apparatus for Providing Memory-Based Device Emulation" filed on Jun. 18, 1999, and in co-pending U.S. patent application Ser. No. 09/336,281, entitled "System and Method for Inserting One or More Files Onto Mass Storage" filed Jun. 18, 1999, each of which is assigned to Phoenix Technologies, Ltd., the assignee of the present invention, the contents of each of which are incorporated herein by reference.

In one embodiment, the ISUA 86 is a computer software executable program that will determine if there are preinstalled programs that are resident on the end user's system. If so, it will identify those preinstalled programs and create shortcuts (on the desktop in the case of a Windows operating system), or bookmarks, to allow the user to automatically launch the programs. In this embodiment, the executable program is also capable of initiating and establishing two-way communications with one or more applications on the server 22 and/or any one of the service computers 26 (FIG. 1), as described below. Moreover, in one embodiment, graphical content of the initial payload 88a is displayed by display engine 94 on the user's display screen 148 during POST. Alternatively, the graphical content of the initial payload 88a may be displayed after a subsequent booting process. For example, as part of the user's profile as described below, the user may be asked if he or she would like to obtain additional information regarding one or more products and/or services. If the user so desires, content regarding the desired products and/or services will be displayed during subsequent boot processes.

Once POST is completed, the OS is loaded, executed, and initialized. Standard OS drivers and services are then loaded.

The user is then prompted to enter registration information including demographic information such as age, gender, hobbies, etc. In addition, the ISUA 86 is executed, and runs in the background, remaining idle until it detects a communication link established between the computer system 100 and a remote server (e.g., server 22 of FIG. 1) over Network 164 of FIG. 2 (e.g., over the Internet). In one embodiment, the ISUA 86 may search through the operating system to determine if there are applications that have been pre-loaded and pre-installed onto the system. If so, the ISUA 86 may automatically provide short cuts and/or bookmarks for the applications to launch into a predetermined server once the communication link is established. This communication link can be established with a network protocol stack, (e.g. TCP/IP) through sockets, or any other two-way communications technique known in the art. Once the communication link 30 is established, the ISUA 86 issues a request signal to the server 22 (as shown by A2) to download an initial content package 62 from a content module 60. Responsive to the request, the server downloads the initial content package 62 (as shown by A3), which, in one embodiment, is stored in the mass storage device 152. In one embodiment, the initial content 62 and subsequent content 64 may be developed separately, and each is encrypted and/or digitally signed using encryption keys, prior to storing of the initial content 62 and subsequent content 64 on the server 22. When the initial content 62 and/or subsequent content 64 is/are subsequently downloaded into system 100, the crypto engine 92 will use keys 90 to decrypt the initial content 62 and/or subsequent content 64.

As discussed earlier, the initial content package 62 may include applications 62a, drivers 62b, and payloads 62c. In one embodiment, the applications 62a include a data loader application and a profile manager application. The data loader application functions in the same or a similar manner as ISUA 86, and once downloaded, disables and replaces the ISUA 86. More specifically, the data loader application is a computer software program which is also capable of initiating, establishing, and terminating two-way communications between the server 22 and the computer system 100. The data loader application also provides traffic control management between the server 22 and computer system 100, as well as other functions to facilitate communication between the end user's system and the designated server, and content downloading to the end user's system.

The profile manager obtains the user and system profiles of the computer system 100 based on user preferences, system hardware, and software installed at the computer system 100. Upon obtaining the user and system profile of the computer system 100, the profile manager application forwards the results to the data loader application, which subsequently provides the information to the server 22, which matches the user indicted preferences with database 24 (FIG. 1). The results may be forwarded at predetermined intervals or at the user's request. The server 22 then processes the user profile or demographic data and targets content to the users which have similar profiles. In addition, the user profile data of a plurality of users are compiled on the server 22 and aggregated to create an aggregate user profile model. Content is then transmitted to user computer system's based on the user profile data and/or the aggregate user profile model (as shown by A4). The subsequent content 64 is downloaded and stored in system firmware 176, designated by numeral 88b. In one embodiment, the subsequent content 64 is stored in non-volatile memory such as flash or EEPROM, with the loading of the subsequent content being done by reflashing the ROM, as is well known by those skilled in the art. The subsequent content 64 may also be stored as one or more files on mass storage device 152 or may be used to modify the Windows™ system file (under the Windows™ environment). The profile collection process is continued as long as the computer system 100 is activated. In one embodiment, content may be downloaded after the user's profile is received and analyzed at the server 22.

When the computer system 100 is subsequently powered up (see FIG. 4B), the system again performs POST. The content that was previously downloaded and stored in system firmware 176, and subject to copyright issues being resolved, is then displayed, prior to loading and/or execution of the operating system. In the Windows™ environment, the Windows™ logo, which is displayed during the initial loading of the operating system, is subsequently replaced by one or more screen that display the previously downloaded content stored in system firmware 176.

In the case of storing the content as one or more files on the mass storage device 152, as opposed to reflashing the ROM, the Windows™ logo file, which is displayed during boot-up and shutdown, may be altered or replaced. One embodiment utilizing this approach involves replacing the corresponding Windows™ system files with the one or more files showing the content (e.g., a graphic file), as described in co-pending U.S. patent application Ser. No. 09/336,003, entitled "Displaying Images during Boot-up and Shutdown" filed on Jun. 18, 1999, which is assigned to Phoenix Technologies, LTD., the contents of which are incorporated herein by reference. The boot-up Windows display file is named LOGO.SYS and is usually located in the Windows directory. First the Windows™ LOGO.SYS file is transferred from the Windows directory to another directory. Then, the content graphics file is renamed as LOGO.SYS and is transferred to the Windows™ directory. The operating system retrieves this file when the operating system is first launched, and hence the content is displayed on the display screen. Windows™ expects the LOGO.SYS file to be a bit-mapped file with resolution 320×400 and 256 colors although Windows™ will later stretch the resolution to 640×400 for displaying purposes. Therefore, the content graphics file is to be the same graphics format (usually named with the extension ".BMP" before being renamed to LOGO.SYS).

The operating system is then loaded, executed, and initialized. The standard operating system drivers and applications are also loaded. The profile manager is then executed. When a link has been established with the predetermined web site, additional content may be downloaded and subsequently displayed. Such additional content are either provided arbitrarily or provided based on the information obtained from a survey of the user or the user's system. In one embodiment, once the boot process is completed, a portion of the display screen may be used to provide icons or shortcuts that are used to access detailed information regarding the previously displayed messages or advertisements. In a further embodiment, the messages or advertisements may again be displayed during the shut-down process, for example, replacing the screen display that displays the message "Windows is shutting down" or "It is now safe to turn off your computer" with other selected content.

Detailed Description

Figure 5:
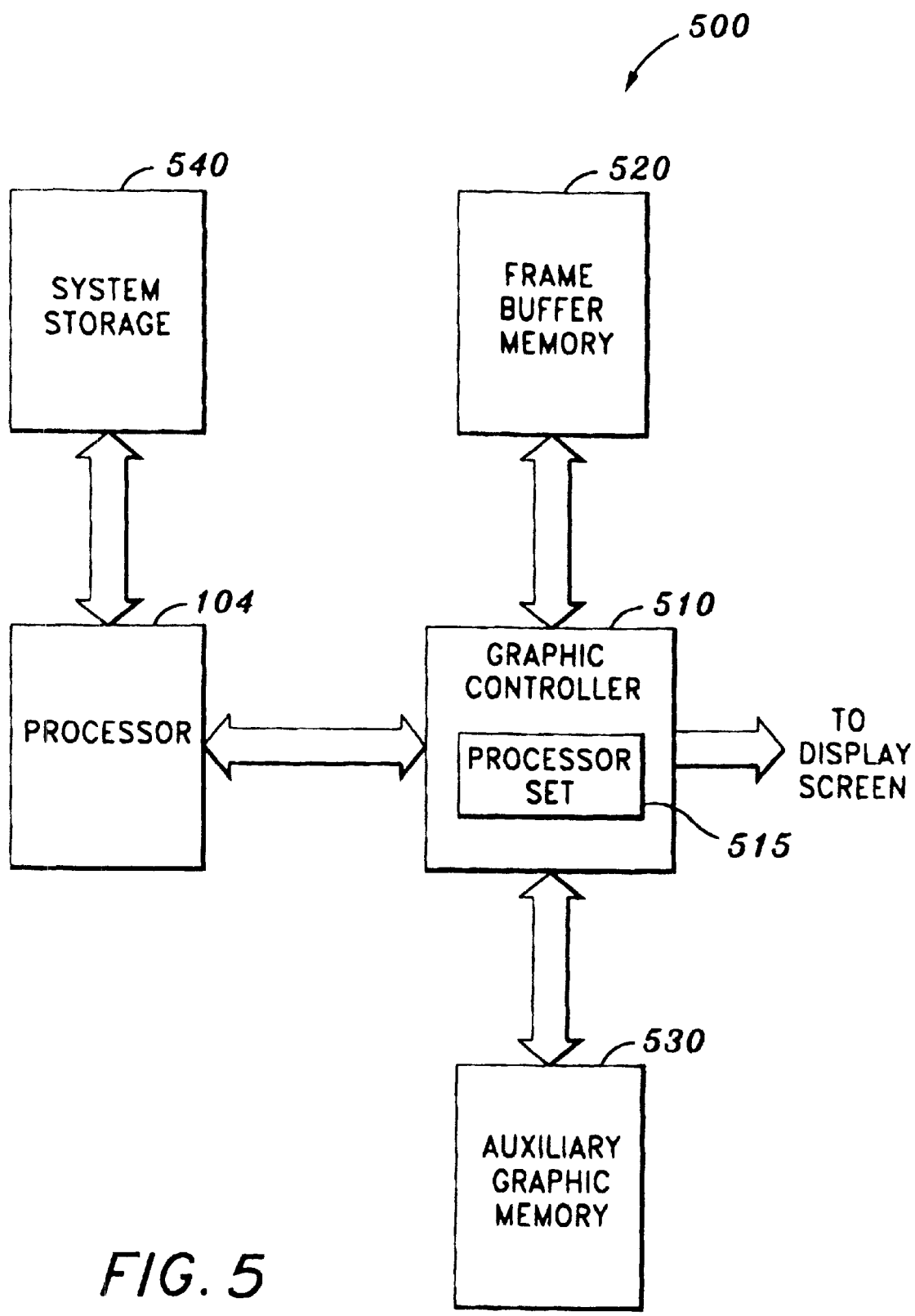
FIG. 5 is a diagram illustrating an architecture to re-generate an image for display according to one embodiment of the invention.

FIG. 5 is a diagram illustrating an architecture 500 to re-generate an image for display according to one embodiment of the invention. The architecture 500 includes a graphic controller 510, a frame buffer memory 520, an auxiliary graphic memory 530, the CPU or processor 104, and a system storage 540.

The graphic controller 510 is a rendering engine that renders the graphics to be displayed on the display screen of the computer system. The graphic controller 510 may be one of the video controller 132 shown in FIG. 2 and the display engine 94 shown in FIG. 3. In one embodiment, the graphic controller 510 is the render engine Pixelfx manufactured by 3Dfx Interactive, Inc. The graphic controller 510 includes a register set 515 that store parameters for rendering. These parameters are part of the graphic information to be used by the graphic controller 510 to render the graphic objects. The register set 515 is accessible to the processor 104. The Pixelfx uses a state machine model. Rendering modes can be set once and then remain in effect until reset. Parameter values are set once and are used whenever the corresponding parameter is invoked (e.g., depth testing). A state of the render engine can be saved and restored by making a copy of the current state of the render engine in a buffer defined by the user.

The frame buffer memory 520 is a memory that contains the graphic data to be rendered by the graphic controller 510. The frame buffer memory 520 may contain the bit-mapped graphics or a digitized image. The frame buffer memory 520 is accessible directly to the graphic controller 510 and can be accessed by the processor 104 via the graphic controller 510 or directly by a separate bus (not shown).

The auxiliary graphic memory 530 is a memory that contains auxiliary graphic data to be used by the graphic controller 510. The auxiliary graphic memory 530 is accessible to both graphic controller 510 and the processor 104. For example, the auxiliary graphic memory 530 may be a texture memory used by a variety of rendering techniques such as Gouraud shading, texture mapping, texture mapping with lighting, and texture space decompression.

The processor 104 is the central processing unit (CPU) of the computer system as shown in FIG. 2. The processor 104 has access to the internal storage of the graphic controller 510, the frame buffer memory 520, the auxiliary graphic memory 530, and the system storage 540.

The system storage 540 includes all the memories accessible to the processor 104. The system storage may include the system memory 124, the expansion memory 176, or the mass storage 152 as shown in FIG. 2. The system storage 540 is normally not accessible to the graphic controller 510. The system storage 540 stores information, code, data as used by the processor 104.

Figure 6:
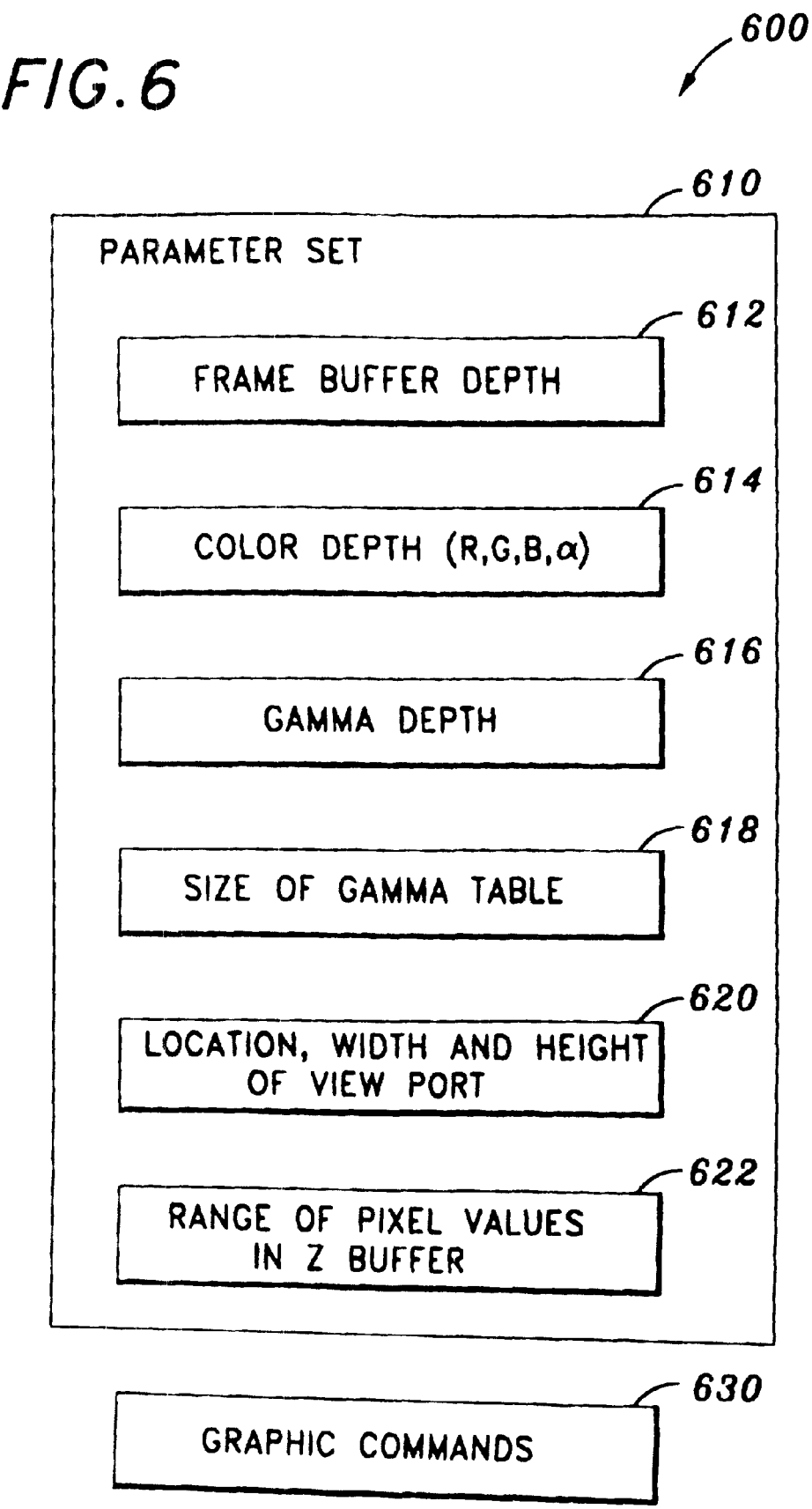
FIG. 6 is a diagram illustrating graphic information used by a graphic controller to generate a displayed image according to one embodiment of the invention.

FIG. 6 is a diagram illustrating graphic information 600 used by a graphic controller to generate a displayed image according to one embodiment of the invention. The graphic information 600 includes a graphic parameter set 610 and a graphic command set 630.

The graphic parameter set 610 includes a set of parameters that is used by the graphic controller 510 shown in FIG. 5 to render the graphic objects. The graphic parameter set 610 is stored in a buffer area accessible to the graphic controller 510. Examples of the graphic parameters include frame buffer depth 612, color depth 614, gamma depth 616, size of gamma table 618, viewport parameters 620 (e.g., location of origin, width, and height), and range of pixel values 622.

The graphic command set 630 includes commands that are issued to the graphic controller 510 to cause the graphic controller 510 to perform a rendering function. Examples of graphic commands include line drawing, triangle drawing, shading, etc. When the graphic controller 510 receives a graphic command, it will carry out the function using the graphic information. The graphic commands may be stored in a queue, a temporary buffer, or may be issued by the processor 104 during the graphic rendering process.

Figure 7:
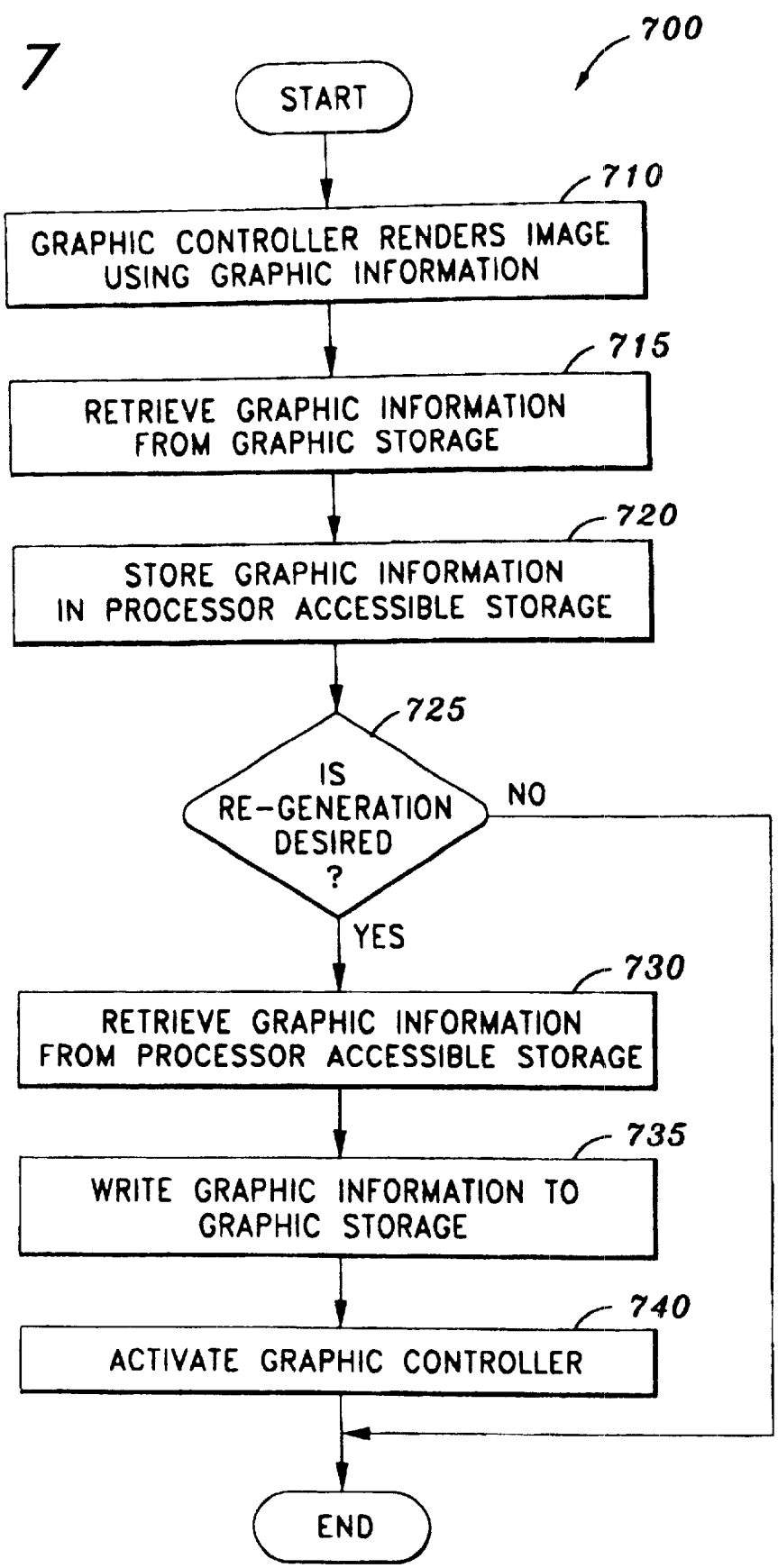
FIG. 7 is a flowchart illustrating a process to re-generate a displayed image according to one embodiment of the invention.

FIG. 7 is a flowchart illustrating a process 700 to re-generate a displayed image according to one embodiment of the invention.

Upon START, the graphic controller renders the image of the graphic objects using the graphic information (Block 710). The graphic information may include the graphic parameters or commands. The graphic information may also include the bitmapped data stored in the frame buffer memory or the texture data stored in the auxiliary buffer memory.

The process 700 retrieves the graphic information from the graphic storage (715). The retrieval of the graphic information may be performed by the graphic controller, the processor, or another device such as a direct memory access (DMA) controller. The graphic storage includes the register set inside the graphic controller, the frame buffer memory, and the auxiliary buffer memory. Then, the process 700 stores the retrieved graphic information in a storage that is accessible to the processor (Block 720). This processor-accessible storage may be the system memory RAM, a flash memory, or a mass storage device.

Then the process 700 determines if the re-generation of rendered graphics is desired (Block 725). If not, the process 700 is terminated. If it is desired to re-generate the displayed graphics, the process 700 retrieves the stored graphic information from the processor-accessible storage (Block 730).

After retrieving the graphic information, the process 700 writes the graphic information into the corresponding graphic storage (Block 735). For example, if the graphic information is the parameter set, the process 700 writes the parameter values to the register set in the graphic controller. If the graphic information includes the graphic commands, the process 700 writes the commands to the command registers of the graphic controller.

Then the process activates the graphic controller to cause the graphic controller to re-generate the rendered image (Block 740). Since the graphic information of the rendered image is restored, the graphic controller re-generates the image as previously rendered. In some situations, the process 700 may further provides additional information to the graphic controller to complete the re-generation process.

The image re-generation and reuse has its application within the context of displaying useful information during the Windows Operating system startup on a PC computer.

During the BIOS boot period a graphics engine generates an image into the display adapter. This image is comprised of multiple parts that form a whole. The image is stored as parts to save space in the BIOS ROM. This data is in a proprietary format that needs to be prepared for the display hardware. A program called a Graphics Engine does this preparing. The fact that a graphics engine is required to render that image data makes it more complicated to display the image. This complexity is required as it allows space to be saved in the ROM. The gain of this invention is to generate an image that is simpler to display and does not require the graphics engine code.

What this invention does is to retrieve from the display adapter the color palette and the bitmap information after the graphics engine has rendered the data. The information extracted from the display adapter is stored in a file on the hard drive. The file is in a format that is recognized by other programs.

In one embodiment, an image capture and re-generation program starts by generating a file that follows the standard Windows BitMap format (.BMP file). First a header containing the type of the graphics format, the width and height, and the number of colors is written to that file. The processor of the system then accesses the palette by programming a palette index register in the PC's standard Video Graphics Adapter (VGA). The color information is then read from another hardware register. The information made available by the display adapter is a triplet of bytes containing the color components (Red, Green, Blue) for that given color index. The color values are adjusted to match the BMP format (Blue, Green, Red, and one unused value), and then stored in the file after the header. The bitmap data is then read from the video memory of the display adapter. As the amount of bitmap data exceeds what the display adapter can present to the processor an extra set for registers of the display adapter is programmed to make each memory plane of bitmap data available to the processor. Each plane of memory contains only every fourth pixel on the screen and needs to be reorganized before being written to the BMP file. Plane 0 represents pixels 0,4,8, . . . plane 1 represents pixels 1,5,9, . . . plane 2 represents pixels 2,6,10, . . . and plane 3 represents pixels 3,7,11, . . . That data is written to the file after the color palette. The file is then closed.

This pseudo can be described as follows:

1. Create a Windows bitmap file and write a header with the 320×400 dimensions and 256 colors.
2. Locate the VGA's memory starting address in the system using the VGA hardware registers
3. For all 256 colors write to the color index register then read the Red, Green, and Blue values. Store these values after the bitmap header in Blue, Green, Red order and add an extra unused byte to suit the BMP format of Windows.
4. For each line of the screen (starting at the end of the screen): For each of the 4 planes read the data and store the pixels spread out by four in the line buffer offsetting the position in the line buffer by the plane number. Write the line buffer into the bitmap file and goto the next line up.
5. Close the bitmap file This generated file now contains an image and its color information. This file can easily be reused and displayed. The chosen format of the file is compatible with numerous other programs and systems. In one embodiment, the generated file is used by the Windows Operating System as its boot screen and/or shutdown screens. That means that the file generated is stored as LOGO.SYS in the root directory and/or as LOGOW.SYS and LOGOS.SYS.

Thus, the present invention is an efficient technique to re-generate a displayed image. The processor retrieves the graphic information used by the graphic controller to generate a displayed image. The graphic information is then stored in a storage accessible to the processor. When it is desired to re-generate the displayed image, the processor retrieves the stored graphic information from the processor storage and writes to the graphic controller storage.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to re-generate a displayed image comprising:
    retrieving graphic information from a first storage, the graphic-information being used by a hardware graphic controller to generate the displayed image, the first storage being accessible to a processor and the hardware graphic controller;
    storing the graphic information in a second storage accessible to the processor;
    retrieving the stored graphic information from the second storage; and
    writing the stored graphic information to the first storage to cause the hardware graphic controller to re-generate the displayed image.
2. The method of claim 1 wherein the graphic information includes graphic commands used by the hardware graphic controller to generate the displayed image.
3. The method of claim 2 wherein the first storage includes at least a register that stores the graphic commands.
4. The method of claim 2 wherein the first storage includes a display buffer that stores the bit-mapped data.
5. The method of claim 4 wherein the first storage further includes at least a register that stores the color palettes and the rendering information used by the graphic controller to generate the displayed image.
6. The method of claim 2 wherein the second storage is a non-volatile writable memory.
7. The method of claim 1 wherein the graphic information includes bit-mapped data, color palettes, and rendering data.
8. The method of claim 1 wherein the second storage is one of a volatile memory and a non-volatile memory.
9. The method of claim 8 wherein the volatile memory includes a random access memory.
10. The method of claim 8 wherein the non-volatile memory is one of a programmable read only memory, a flash memory, and a mass storage memory.
11. A computer program product comprising:
    a computer usable medium having computer program code embodied therein to re-generate a displayed image, the computer program product having:
        computer readable program code for retrieving graphic information from a first storage, the graphic information being used by a hardware graphic controller to generate the displayed image, the first storage being accessible to a processor and the hardware graphic controller;
        computer readable program code for storing the graphic information in a second storage accessible to the processor;
        computer readable program code for retrieving the stored graphic information from the second storage; and
        computer readable program code for writing the stored graphic information to the first storage to cause the hardware graphic controller to re-generate the displayed image.
12. The computer program product of claim 11 wherein the graphic information includes graphic commands used by the hardware graphic controller to generate the displayed image.
13. The computer program product of claim 12 wherein the first storage includes at least a register that stores the graphic commands.
14. The computer program product of claim 12 wherein the first storage includes a display buffer that stores the bit-mapped data.

15. The computer program product of claim 14 wherein the first storage further includes at least a register that stores the color palettes and the rendering information used by the graphic controller to generate the displayed image.

16. The computer program product of claim 12 wherein the second storage is a non-volatile writable memory.

17. The computer program product of claim 11 wherein the graphic information includes bit-mapped data, color palettes, and rendering data.

18. The computer program product of claim 11 wherein the second storage is one of a volatile memory and a non-volatile memory.

19. The computer program product of claim 18 wherein the volatile memory includes a random access memory.

20. The computer program product of claim 18 wherein the non-volatile memory is one of a programmable read only memory, a flash memory, and a mass storage memory.

21. A computer data signal embodied in a carrier wave comprising:
   a image regeneration code segment to re-generate a displayed image, the image re-generation code segment having:
      a first retrieval code segment for retrieving graphic information from a first storage, the graphic information being used by a hardware graphic controller to generate the displayed image, the first storage being accessible to a processor and the hardware graphic controller;
      a store code segment for storing the graphic information in a second storage accessible to the processor;
      a second retrieval code segment for retrieving the stored graphic information from the second storage; and
      a write code segment for writing the stored graphic information to the first storage to cause the hardware graphic controller to re-generate the displayed image.

22. The computer data signal of claim 21 wherein the graphic information includes graphic commands used by the hardware graphic controller to generate the displayed image.

23. The computer data signal of claim 22 wherein the first storage includes at least a register that stores the graphic commands.

24. The computer data signal of claim 22 wherein the first storage includes a display buffer that stores the bit-mapped data.

25. The computer data signal of claim 24 wherein the first storage further includes at least a register that stores the color palettes and the rendering information used by the graphic controller to generate the displayed image.

26. The computer data signal of claim 22 wherein the second storage is a non-volatile writable memory.

27. The computer data signal of claim 21 wherein the graphic information includes bit-mapped data, color palettes, and rendering data.

28. The computer data signal of claim 21 wherein the second storage is one of a volatile memory and a non-volatile memory.

29. The computer data signal of claim 28 wherein the volatile memory includes a random access memory.

30. The computer data signal of claim 28 wherein the non-volatile memory is one of a programmable read only memory, a flash memory, and a mass storage memory.

31. A system comprising:
   a processor; and
   a memory coupled to the processor, the memory containing program code to re-generate a displayed image, the program code, when executed by the processor, causing the processor to:
      retrieve graphic information from a first storage, the graphic information being used by a hardware graphic controller to generate the displayed image, the first storage being accessible to a processor and the hardware graphic controller,
      store the graphic information in a second storage accessible to the processor,
      retrieve the stored graphic information from the second storage, and
      write the stored graphic information to the first storage to cause the hardware graphic controller to re-generate the displayed image.

32. The system of claim 31 wherein the graphic information includes graphic commands used by the hardware graphic controller to generate the displayed image.

33. The system of claim 32 wherein the first storage includes at least a register that stores the graphic commands.

34. The system of claim 32 wherein the first storage includes a display buffer that stores the bit-mapped data.

35. The system of claim 34 wherein the first storage further includes at least a register that stores the color palettes and the rendering information used by the graphic controller to generate the displayed image.

36. The system of claim 32 wherein the second storage is a non-volatile writable memory.

37. The system of claim 31 wherein the graphic information includes bit-mapped data, color palettes, and rendering data.

38. The system of claim 31 wherein the second storage is one of a volatile memory and a non-volatile memory.

39. The system of claim 38 wherein the volatile memory includes a random access memory.

40. The system of claim 38 wherein the non-volatile memory is one of a programmable read only memory, a flash memory, and a mass storage memory.

* * * * *